Oct. 30, 1962  C. H. CHAPPELL  3,061,656
FLEXIBLE HIGH TEMPERATURE THERMOELECTRIC DEVICE
Filed Dec. 12, 1961
*Fig.1.*
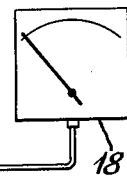
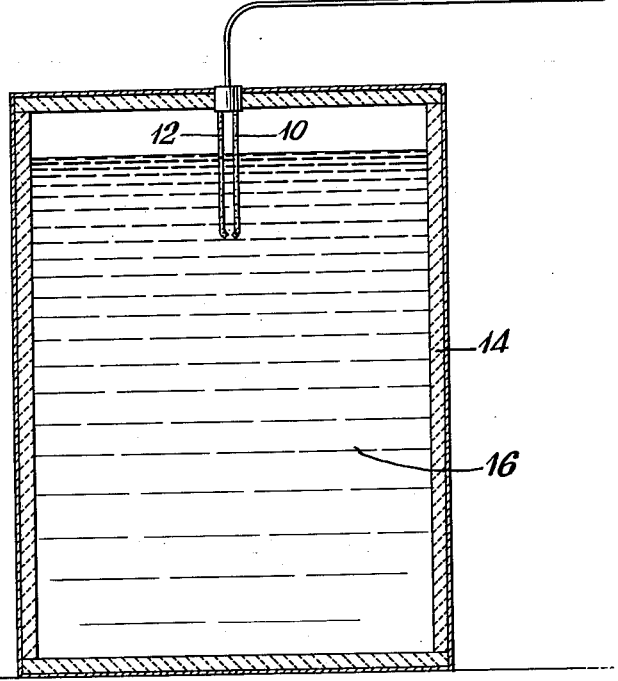
*Fig.2.*
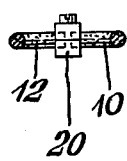
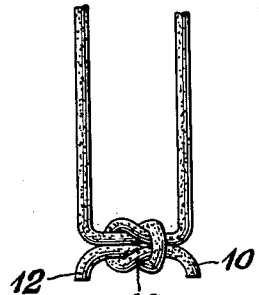
*Fig.3.*
INVENTOR
CHARLES H. CHAPPELL
BY
ATTORNEY

3,061,656
FLEXIBLE HIGH TEMPERATURE THERMOELECTRIC DEVICE
Charles H. Chappell, New York, N.Y., assignor to Union Carbide Corporation, a corporation of New York
Filed Dec. 12, 1961, Ser. No. 160,693
4 Claims. (Cl. 136—4)

This invention relates to thermoelectric devices suitable for use at very high temperatures. It more particularly refers to such devices which are as flexible as conventional textile materials.

A thermocouple is formed when two dissimilar conductive materials are joined at each end thereof with each other. When one of the junctions is placed at an ambient temperature which is higher than the other, a potential is induced which is a function of the particular dissimilar materials and the temperature differential between the junctions. If a source of potential is placed in the circuit in such position as to oppose the thermally induced potential, it is possible to measure the amount of thermally induced voltage and thereby indirectly measure the temperature differential between the hot and the cold junction. This same pair of junctions of two dissimilar materials may be used to produce useful electric power by draining off the induced potential rather than opposing and measuring it. A number of such junctions could be connected in series to make a thermopile which provides the aggregate output of each individual couple.

It is also possible to reverse the action of a thermocouple or thermopile so as to put electric power through the junctions of dissimilar materials from an external source. One junction will thus be cooled and the opposite junction will be heated. Applications for this phenomenon are readily apparent in the heating and refrigeration fields.

There have been a great many attempts to form such thermoelectric devices of refractory materials capable of withstanding, measuring and utilizing temperatures up to 3000° C. Thermoelectric devices made of conventional materials fail at very high temperatures because they either melt or sublime.

A recent U.S. Patent 2,946,835, issued to R. D. Westbrook et al. on July 26, 1960, discloses a thermocouple which can withstand temperatures in excess of 2000° C. This thermocouple utilizes graphite and boron doped graphite, or boronated graphite, as the two dissimilar materials. Boronated graphite is a new material which comprises graphite which has been thermoelectrically modified by the inclusion as an essential constituent therein of atoms of boron as impurities in the graphite. It should be understood that this material is not boron carbide, but is graphite which has been modified by the inclusion of atomic boron in the crystal lattice thereof.

While the above described thermocouples have proven of considerable value, unfortunately they are rigid and therefore subject to breakage due to impact. In addition, the fact that they are rigid, limits the use of the thermocouples to applications where a fixed position is possible.

Accordingly, the principal object of the invention is to provide a thermoelectric device which is operable at very high temperatures and which is also flexible.

Fulfilling this object, this invention comprises a flexible thermoelectric device consisting of two electrically conductive dissimilar flexible textile elements which are highly refractory. More specifically, the two dissimilar elements are graphite and boronated graphite, both of which are in a flexible textile form. Understanding of this invention will be facilitated by reference to the accompanying drawing, wherein:

FIG. 1 is an elevation partially in section of a thermoelectric device according to this invention in use;

FIG. 2 shows in elevation a modified contacting means for a junction of a thermoelectric device according to this invention; and FIG. 3 is similar to FIG. 2 showing another modified contacting means.

Graphite in a flexible fiber and fabric from has recently become commercially available. Flexible graphite in any textile form such as yarns, braids, felts or fabrics that are woven or knit is available.

As stated above, the thermocouple of the invention consists of one element of such flexible textile graphite with the other element being such flexible textile graphite which has been boronated.

The boronation of a piece of flexible graphite may be suitably carried out by impregnating flexible graphite with a boric acid solution at room temperature. The impregnated flexible graphite textile material is then packed in a mixture of coke and boric acid in a graphic capsule and then heated to a temperature above that at which the ultimate thermocouple will operate, preferably 3000° C. The amount of boron which will be impregnated in the fibers of the flexible graphite textile material may be controlled by regulating the concentration of the boric acid in the packing material. In actual practice the concentration should be such that from about .01% to about 1.5% by weight of elemental boron diffuses into the graphite crystal lattice.

Having prepared the flexible graphite textile material elements, both doped and plain, it is necessary that the two elements be properly joined at two points to form the junctions. The hot junction may be formed by applying a suitable carbonaceous cement, mechanically pressing the two elements together, immersing the two elements in a molten conductive material which is the heat source being measured or utilized, or any other convenient method. The cold junction presents much less of a problem since conventional joining means such as copper shunts or clamps may be used. A suitable hot or cold junction may also be made by twisting or knotting a small area of the elements with each other.

Referring now to the drawing, a typical thermocouple of the invention having two flexible thermoelectric elements 10 and 12 is shown. One of the elements is a plain flexible graphite textile material and the other has been boronated as described. A furnace 14 containing a molten metal 16 is shown in FIG. 1 and the flexible thermoelectric elements 10 and 12 are immersed in the molten metal thereby forming a hot junction. The elements 10 and 12 pass through the furnace wall and a cold junction is formed at a meter 18 some distance from the furnace. This meter 18 may be calibrated to read directly in terms of temperature.

A modified contacting means for the hot junction of a thermoelectric device is shown in FIG. 2 wherein a screw type clamp 20 preferably of graphite or boronated graphite serves to hold the flexible elements 10 and 12 together at this point thereby forming a hot junction. Similarly, FIG. 3 shows the use of a simple knot 32 as the means whereby a hot junction is formed with the flexible thermoelectric elements 10 and 12.

As one example of the application of this invention, thermocouples have been made utilizing boronated graphite yarn, doped with 1.3 weight percent boron, joined to undoped, plain graphite yarn. Exemplary voltage output of representative thermocouples is shown below in Table I:

Table I

| Boronated Graphite Yarn Potential (Millivolts) | v. | Plain Graphite Yarn Temperature, ° C. |
|---|---|---|
| 3.5 | | 200 |
| 3.1 | | 800 |
| 45 | | 1,200 |
| 53 | | 1,500 |

These data are exemplary only of the temperature measuring capabilities of thermocouples made according to this invention. Such thermocouples have proven reliable over the temperature range from room temperature to 2000° C. in neutral or reducing atmospheres, or in vacuum. This thermocouple will operate reliably above 2000° C. for short periods of time, in the range of hours. Ultimate maximum reliable operating temperature is in the range up to 2800° C. although readings as high as 3000° C. have been obtained on a short term basis.

The flexible thermocouples of the invention may advantageously be used in situations where there is a possibility of direct impact thereon or where an intricately shaped thermocouple is needed. Further, less material is usually necessary for flexible thermocouples than for the rigid type although the quantity of material used is in no way a limiting factor. Since it is only necessary to use a very small amount of material, it is practical to make thermocouples which may be used only once and are thereafter destroyed.

The same principles stated herein are applicable to other thermoelectric devices, such as generators, refrigerators, and heaters at moderate and low temperatures as well as at the relatively high temperatures described in the preceding paragraph. The combination of flexibility, high thermoelectric output and refractoriness of the subject thermoelectric device is unusual and makes it extremely useful for industry and laboratory applications.

This application is a continuation-in-part of U.S. patent application, Serial No. 15,255, filed March 16, 1960.

I claim:

1. A thermoelectric device operable to temperatures up to 3000° C. in a non-oxidizing atmosphere which consists of at least two flexible textile refractory elements electrically joined together in a thermocouple junction at two points, one of said elements being plain flexible graphite and the other of said elements being boronated flexible graphite which contains from .01% to 1.5% by weight elemental boron.

2. A thermoelectric device as described in claim 1 wherein said elements are joined by clamping means.

3. A thermoelectric device as described in claim 1 wherein one of said junctions is by means of immersion in a molten conductive material.

4. A thermoelectric device as described in claim 1 wherein said elements are joined by means of small area knots.

References Cited in the file of this patent

UNITED STATES PATENTS

| 2,665,322 | MacDonald | Jan. 5, 1954 |
| 2,946,835 | Westbrook et al. | July 26, 1960 |